United States Patent [19]

Gloyne et al.

[11] Patent Number: 4,794,596
[45] Date of Patent: Dec. 27, 1988

[54] DATA NETWORK SYNCHRONISATION

[76] Inventors: Francis R. Gloyne, 48 Beech View Road, Kingsley, nr Frodsham Cheshire; Philip D. Harvey, 89 Church Road, Bickerstaffe, Ormskirk Lancs, both of England

[21] Appl. No.: 6,679
[22] PCT Filed: Jul. 1, 1986
[86] PCT No.: PCT/GB86/00384
§ 371 Date: Jan. 21, 1987
§ 102(e) Date: Jan. 21, 1987
[87] PCT Pub. No.: WO87/00369
PCT Pub. Date: Jan. 15, 1987

[30] Foreign Application Priority Data

Jul. 1, 1985 [GB] United Kingdom ................ 8516609

[51] Int. Cl.[4] .................................................. H04J 3/04
[52] U.S. Cl. ..................................... 370/112; 370/103
[58] Field of Search .................... 370/86, 100, 103, 85, 370/89, 112; 375/118, 119, 107, 120; 340/825.05

[56] References Cited

U.S. PATENT DOCUMENTS

| | | | |
|---|---|---|---|
| 2,986,723 | 5/1961 | Darwin et al. | 375/107 |
| 3,940,558 | 2/1976 | Gabbard et al. | 370/103 |
| 4,002,839 | 1/1977 | Karl et al. | 370/103 |
| 4,042,781 | 8/1977 | Dragotinov | 370/103 |
| 4,074,074 | 2/1978 | Doutmy et al. | 370/112 |
| 4,301,532 | 11/1981 | DittmarJanetzky | 370/85 |
| 4,622,665 | 11/1986 | Jonsson | 370/100 |
| 4,677,614 | 6/1987 | Circo | 370/86 |

OTHER PUBLICATIONS

"Network Synchronization and Synchronous Digital Terminals", Tazaki et al., IEEE Catalog No. 78CH1350-8 CSCB, Jun. 4–7, 1978.
"Synchronization of the NTT Digital Network", Inoue et al, ICC76, Jun. 14–16, 1976.

Primary Examiner—Robert L. Griffin
Assistant Examiner—Stephen Chin
Attorney, Agent, or Firm—Parkhurst, Oliff & Berridge

[57] ABSTRACT

In a data network comprising multiplexers (M/X(A) etc) connected together by data links (1,2,3), and having clock sources (MC(1) etc), each multiplexer is provided with a clock selector (CS(A) etc). Each clock selector monitors test signals to establish status of incoming clock signals, and selects one clock signal in predetermined hierarchical order to supply to its associated multiplexer. Alternatively, e.g. in the absence of all test signals, the clock selector sets its associated multiplexer to Slave to Receive mode in which it takes incoming clock signals from one of the other multiplexers as its timing source.

12 Claims, 8 Drawing Sheets

DATA NETWORK SYNCHRONISATION

This invention relates to a synchronised data network, and to a device for maintaining the synchronisation of the data network in the event of failure of certain components of the network.

The successful transmission of data over data links is dependent on maintaining synchronised both ends of the link. The failure of clock sources or data lines may cause the network to "free run", or one site may be timed by a clock source unsynchronised with respect to the clock source at another site.

It is the object of the present invention to provide a data network which will be maintained in synchronisation even in the event of failure of some of the components of the network.

Accordingly, there is provided a data network comprising a plurality of multiplexers connected one to another by data links; a plurality of clock sources; and a plurality of clock selectors, each clock selector being associate with one of the multiplexers, wherein there is provided means for generating one or more test signals, the clock selectors being adapted to receive one or more of the test signals, determine the presence or otherwise of the test signals to establish the status of one or more incoming clock signals, select one clock signal in predetermined hierarchical order and supply said clock signal to its associated multiplexer, or alternatively set its associated multiplexer to Slave to Receive mode in which the associated multiplexer takes incoming clock signals from one of the other multiplexers as its timing source.

The test signals may be received either directly from a clock source, or from a remote multiplexer to establish the status of the intervening data link. In some cases, therefore, the test will be on the condition of the data network, rather than a direct test on an incoming clock signal. The one or more clock selectors are conveniently adapted to set their associated multiplexers to Slave to Receive mode in the absence of all of the one or more test signals.

Preferably at least one clock selector is provided with one or more auxilary clock sources, the at least one clokk selector being adapted to supply clock signals from one of the one or more auxilary clock sources to its associated multiplexer in the absence of incoming clock signals from all of the other multiplexers.

Conveniently the clock sources are synchronised one to another. This allows remote multiplexers to be synchronised from their own local synchronised clock source, as opposed to from a single master clock.

The invention further resides in a data network comprising a plurality of multiplexers connected one to another by data links; a plurality of clock sources; means for generating one or more test signals; and a plurality of clock selectors, each clock selector being associated with one of the multiplexers, and comprising clock input means by which one or more clock signals are input to the clock selector, test input means by which one or more test signals are input to the clock selector, a test unit for determining the presence or otherwise of the one or more test signals, and switch means for selecting one clock signal in predetermined hierarchical order and supplying the said clock signal to its associated multiplexer, or alternatively setting its associated multiplexer to Slave to Receive mode in which the associated multiplexer takes incoming clock signals from on of the other multiplexers as its timing source, the switch means being actuated by signals from the test unit.

The means for generating one or more test signals preferably comprises one or more of the multiplexers. In this way, failure of a remote multiplexer or the intervening data link will cause an absence of a tsst signal, initiating action by one or more of the clock selectors.

The invention further resides in a clock selector adapted to be associated with a multiplexer and having clock input means by which one or more clock signals are input to the clock selector; test input means by which one or more test signals are input to the clock selector; a test unit for determining the presence or otherwise of the one or more test signals; and switch means for selecting one clock signal in predetermined hierarchicial order and supplying the said clock signal to the associated multiplexer, or alternatively setting the associated multiplexer to Slave to Receive mode, the switch means being actuated by signals from the test unit. Conveniently the test unit, in the absence of all of the one or more test signals, sends a signal to actuate the switch means to set the associated multiplexer to Slave to Receive mode. The invention further resides in a data network including a clock selector as previously described.

According to yet another aspect of the invention there is provided a method of selecting a clock source for a multiplexer in a data network comprising a plurality of multiplexers connected one to another by data links, the method including the steps of transmitting one or more test signals from one multiplexer to another; determining the presence or otherwise of the incoming test signals at a particular multiplexer; and, depending on the presence or otherwise of the one or more test signals, selecting one clock signal in predetermined hierarchicial order and supplying it to said particular multiplexer or alternatively setting the particular multiplexer to Slave to Receive mode in which it takes incoming clock signals from one of the other multiplexers as its timing source. The particular multiplexer is preferably set to Slave to Receive mode in the absence of any of the one or more test signals thereat.

These and other aspects of the invention will now be further described, by way of example only, with reference to the accompanying drawings in which.

Figure 1:
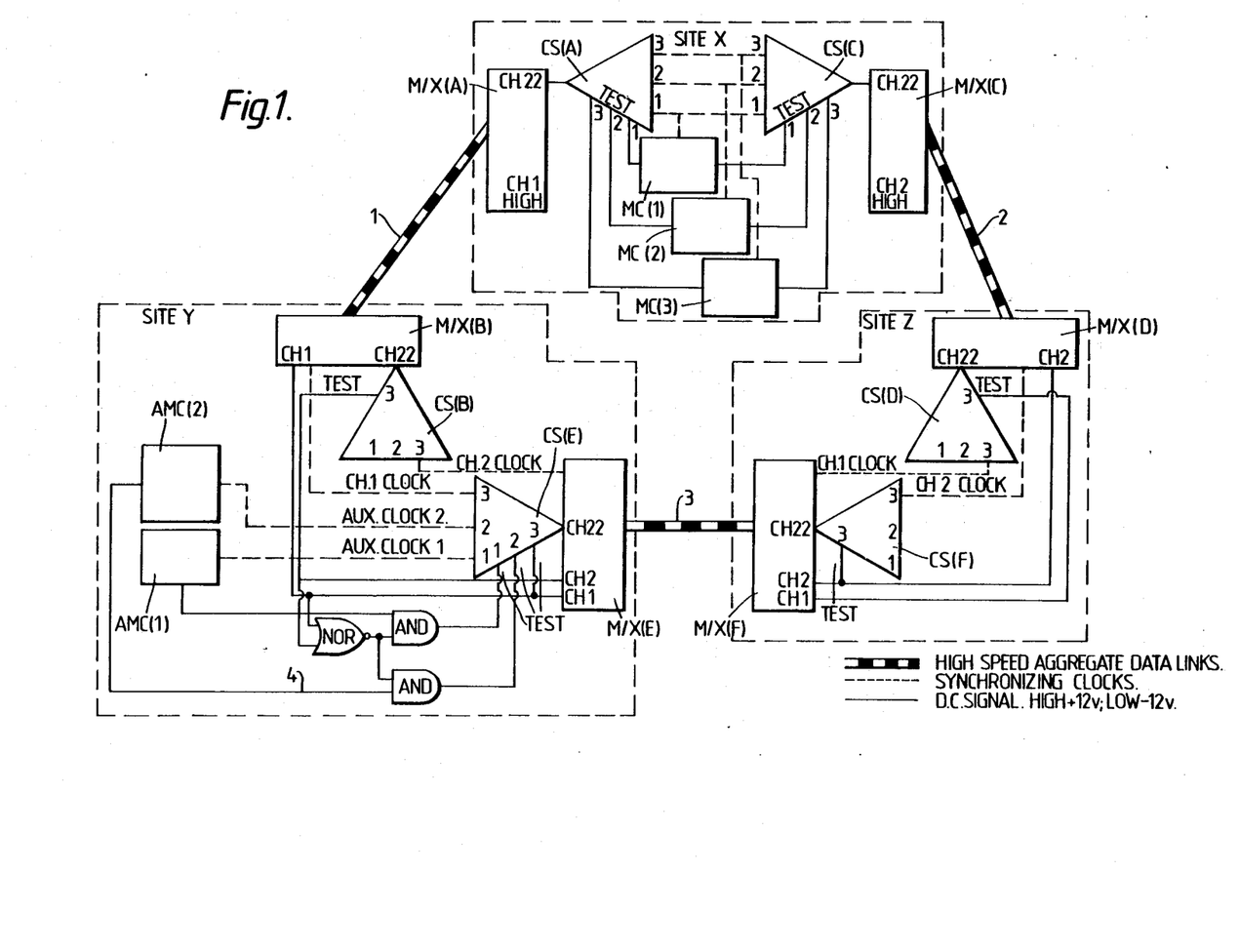
FIG. 1 is a schematic diagram of a data network according to the invention.

Referring to FIG. 1 there is shown a data network comprising uultiplexers M/X(A) to M/X(F), M/X(A) and M/X(C) at site X, M/X(B) and M/X(E) at site Y and M/X(D) and M/X(F) at site Z. High speed aggregate data links connect the three sites, link 1 between sites X and Y, link 2 between sites X and Z, and link 3 between sites Y and Z.

Each multiplexer has an associated clock selector circuit, CS(A) to CS(F). At site X there are three master synchronising clocks MC(1), MC(2) and MC(3), the clocks supplying synchronising signals simultaneously to clock selectors CS(A) and CS(C). Two auxiliary master clocks AMC(1) and AMC(2) are provided at site Y to supply clock selector CS(E) via a NOR/AND gate shown generally at 4.

Figures 2, 3:
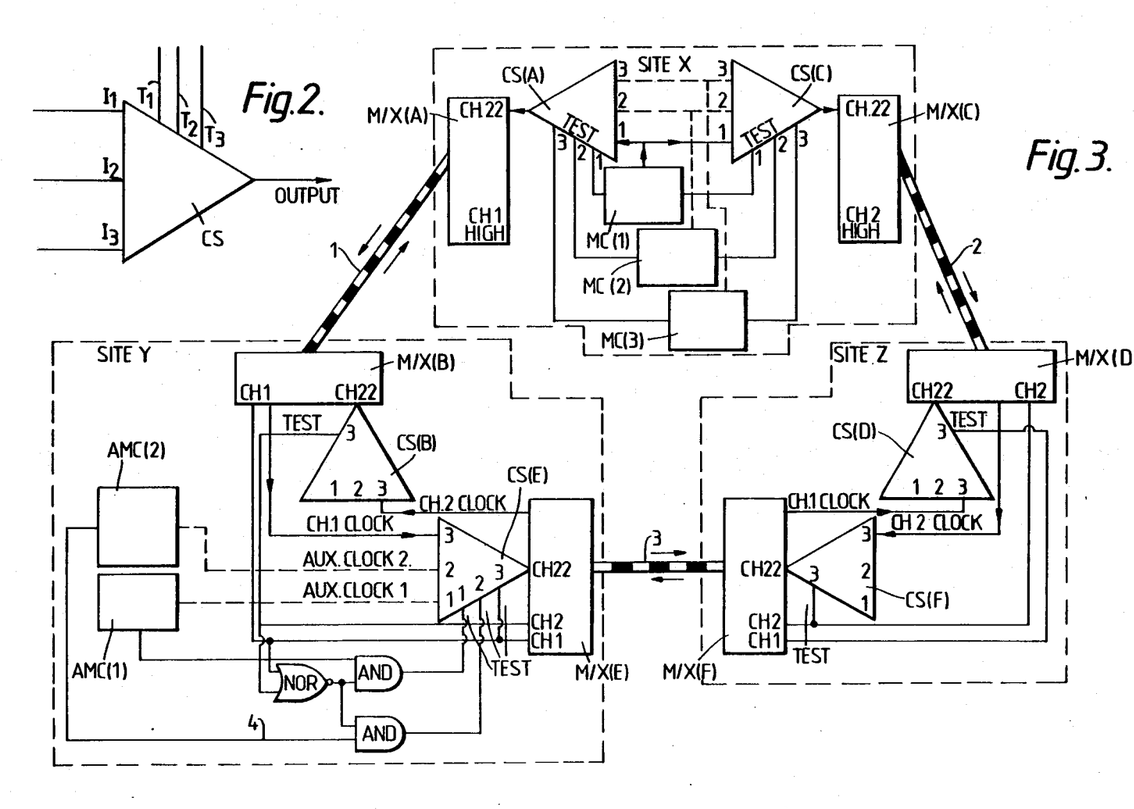
FIG. 2 is a schematic diagram of a clock selector according to a further aspect of the invention.
FIGS. 3 to 7 are schematic diagrams of the data network of FIG. 1 in various circumstances of operation.

As shown in FIG. 2, each clock selector circuit has inputs $I_1$, $I_2$ and $I_3$, test inputs $T_1$, $T_2$ and $T_3$ and an output which sends signals to its associated multiplexer. In general terms the clock selector transmits to the multiplexer signals from one of its inputs $I_1$, $I_2$ or $I_3$ depending on the presence of a signal at the respective test input. In the absence of signals at any of the test inputs $T_1$, $T_2$ or $T_3$ the clock selector circuit sets the multiplexer to Slave to Receive mode in which incoming sychronising clock signals from a distant multiplexer are used as the timing source for the multiplexer.

The normal operation of the data network is shown in FIG. 3. A clock signal from clock MC(1) is input to CS(A) on input $I_1$ and a test signal input to $T_1$. Detecting the presence of a signal at $T_1$ the clock selector transmits the clock signals to M/X(A), which signals are sent along channel 1 between M/X(A) and M/X(B) via aggregate data link 1. Channel 1 of M/X(B) is used as test input $T_3$ of CS(E). On detecting a signal at $T_3$, CS(E) employs input $I_3$, which is the clock signal derived from MC(1) exiting from M/X(B) as a synchronising clock for M/X(E). Similarly the clock signal is transmitted along chnnnel 1 between M/X(E) and M/X(F) via line 3, passed to M/X(D) through clock selector CS(D) and onwards to M/X(C) via line 2. Thus transmission of data around the network in the one direction is all synchronised from a single master clock MC(1).

The same master clock is used to synchronise data transmissions in the opposite direction by feeding signals frmm MC(1) to M/X(C) via its clock selector circuit CS(C). These signals are passed between multiplexers on Channel 2, and again used as a test input to clock selectors CS(F) and CS(B) respectively. The entire data network is synchronised from a single clock source as shown in FIG. 3 with the arrows showing how the synchronising clock signals are transmitted around the network.

Should for some reason MC(1) fail, then there will be no signal present at test inputs $T_1$ of CS(A) and CS(C). If a signal is present at $T_2$ however, the two clock selector circuits will transmit to their associated multiplexers the signal from MC(2) on input $I_2$. Although MC(1) and MC(2) are not necessarily exactly synchronised, as the whole network will now be synchronise from MC(2), the network remains in synchronisation. Should master clock MC(2) also fail then the clock selector circuits CS(A) and CS(C) will select MC(3) as a synchronising clock for the data network.

In the unlikely event of all three master clocks failing, an auxiliary clock source present at another site will be switceed in to synchronise the data network. As the master clocks MC(1) to MC(3) provide the signal on channels 1 and 2, should all three fail simultaneously then there will be no signal at the inputs of the NOR gate 5 at site Y. The NOR/AND gate 4 will accordingly switch in the auxiliary clock AMC(1). A second auxiliary clock AMC(2) is provided as back-up for AMC(1).

Figure 4:
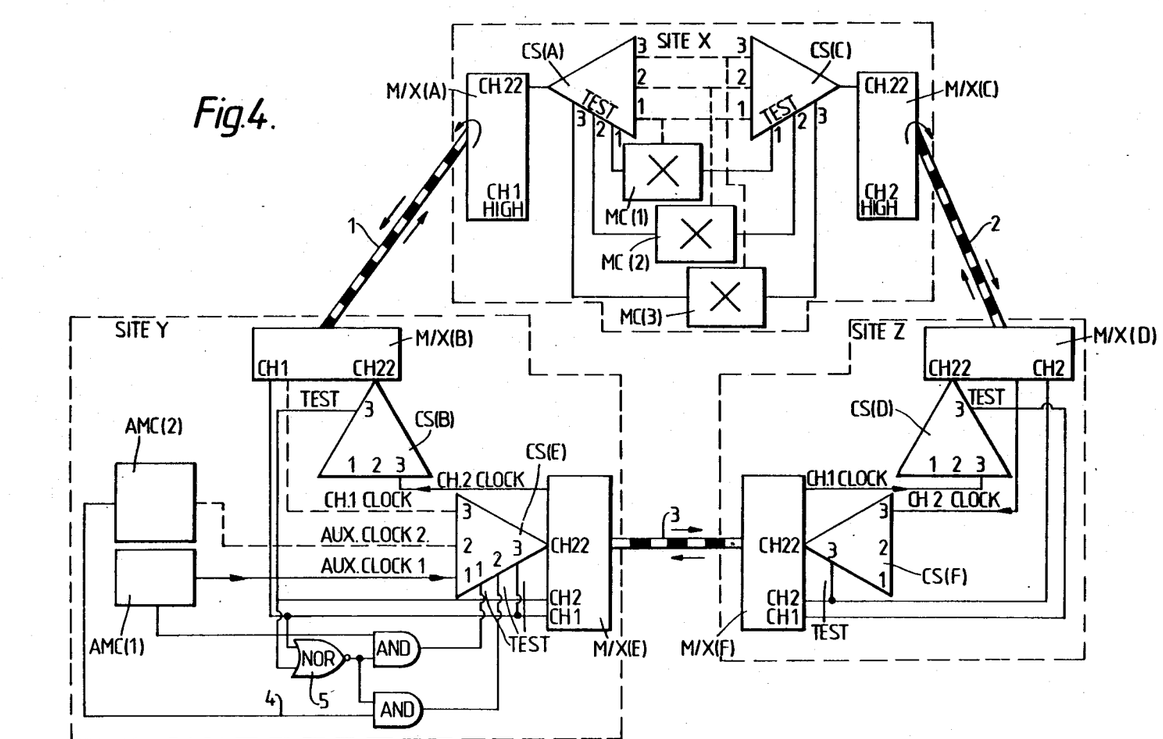

As CS(A) and CS(C) have no signal at any of their test inputs $T_1$, $T_2$ or $T_3$, they will switch their associated multiplexers M/X(A) and M/X(C) to Slave to Receive mode. The entire network will therefore now be synchronised from AMC(1) at site Y, as shown in FIG. 4.

Figure 5:
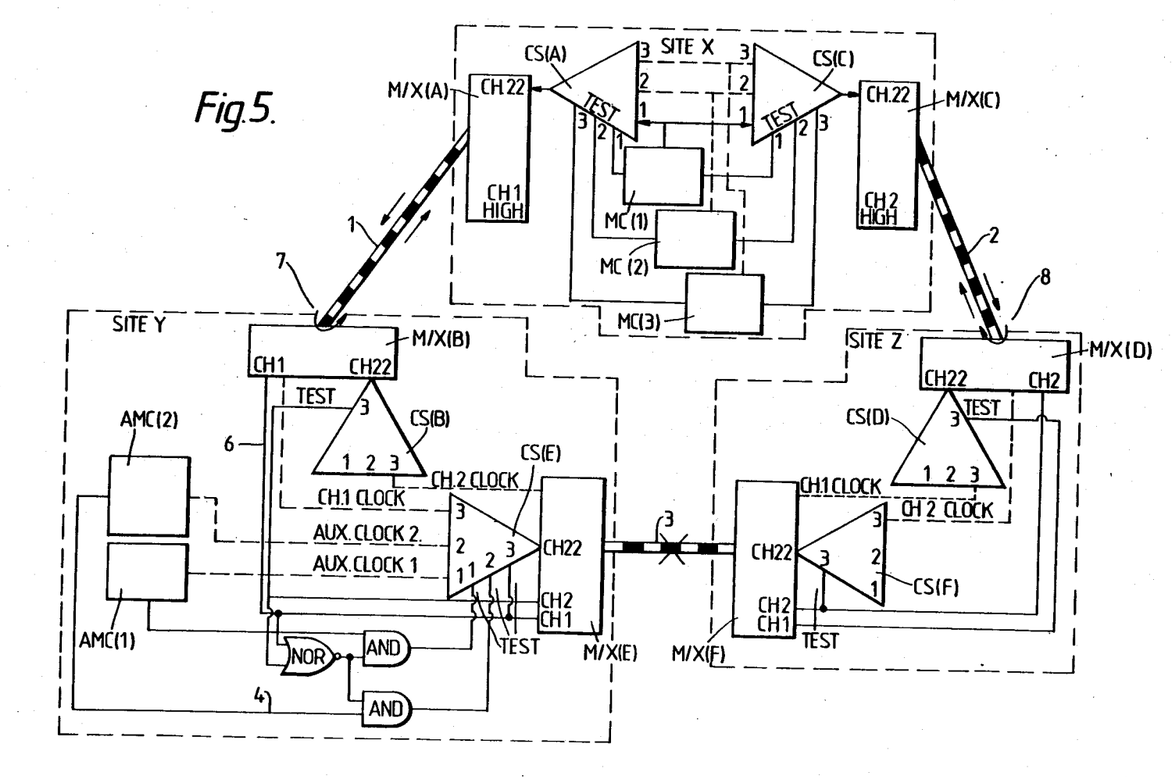

Synchronisation of the network in the event of a failure of one or more of the aggregate data links 1, 2 and 3 will now be considered. FIG. 5 shows the network with link 3 having failed. Due to the failure of link 3, the signal normally present on channel 2 of M/X(E) will be absent. There will accordingly be no signal on line 6 at $T_3$ of CS(B). As CS(B) has no back-up clock sources it will set M/X(B) to Slave to Receive and clock signals received from M/X(A) will accordingly be returned as shown at 7. Similarly the absence of a high on channel 1 from M/X(F) will cause CS(D) to set M/X(D) to Slave to Receive as shown at 8. Thus, although sites Y and Z are temporarily unable to communicate directly, communications between site X and the other sites are maintained as the network is still synchronised from MC(1). On the restoration of the aggregate data link 3, the signals at $T_3$ on CS(B) and CS(D) will be resumed and the network will revert to operation as in FIG. 3.

Figure 6:
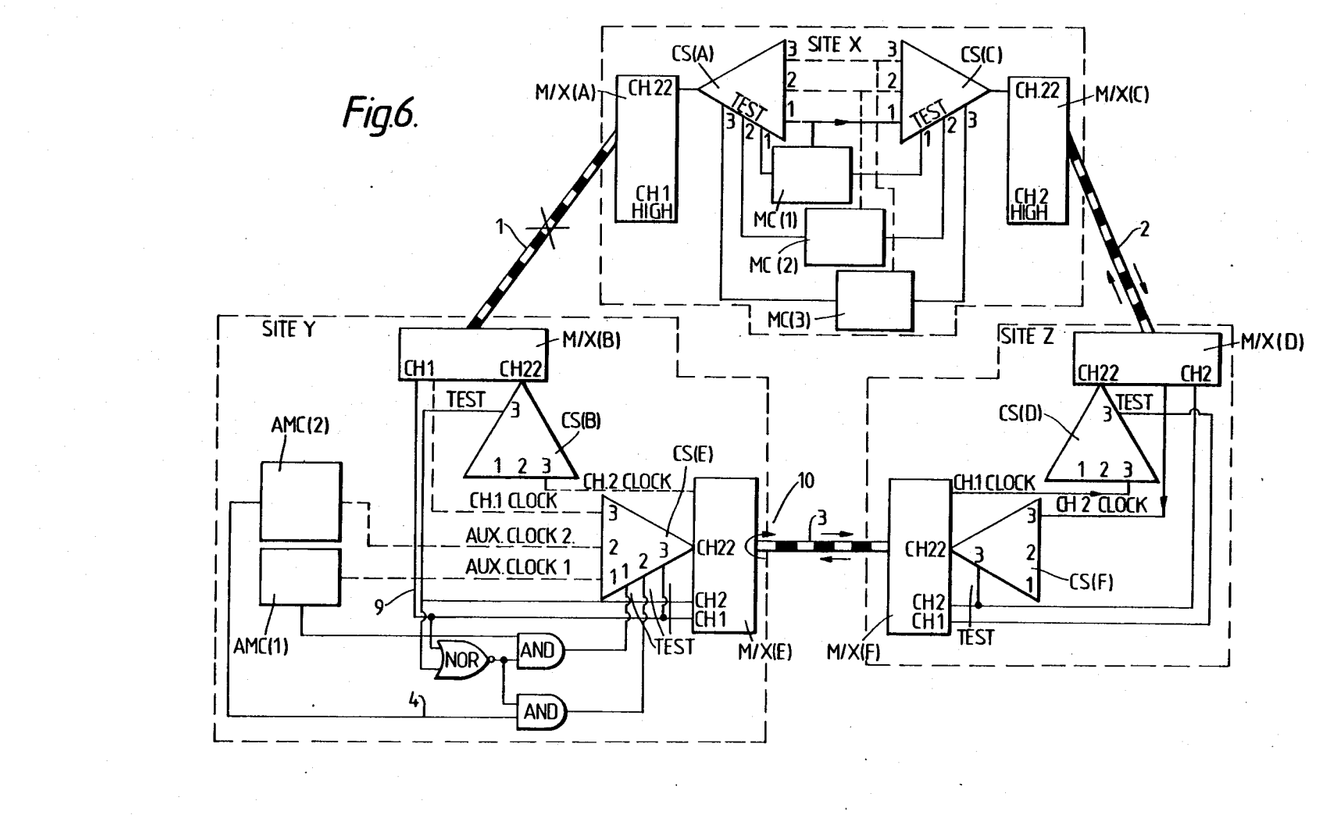

The situation in the event of a failure on aggregate data link 1 is depicted in FIG. 6. Due to the failure of the link 1, there will be no signal from channel 1 of M/X(B) on line 9 for input $T_3$ of CS(E). However, the auxiliary master clocks AMC(1) and AMC(2) will not be switched in as the signal on channel 2 from M/X(E) obtained from site Z will inhibit the NOR/AND gate 4. Therefore clock selector CS(E) will switch M/X(E) to Slave to Receive as shown at 10 in FIG. 6, and communications between sites X and Z, and sites Y and Z may continue uninterrupted. A similar situation exists in the event of a failure of link 2, with CS(F) setting M/X(F) to Slave to Receive to return the clock signals received from M/X(E) at site Y.

Figure 7:
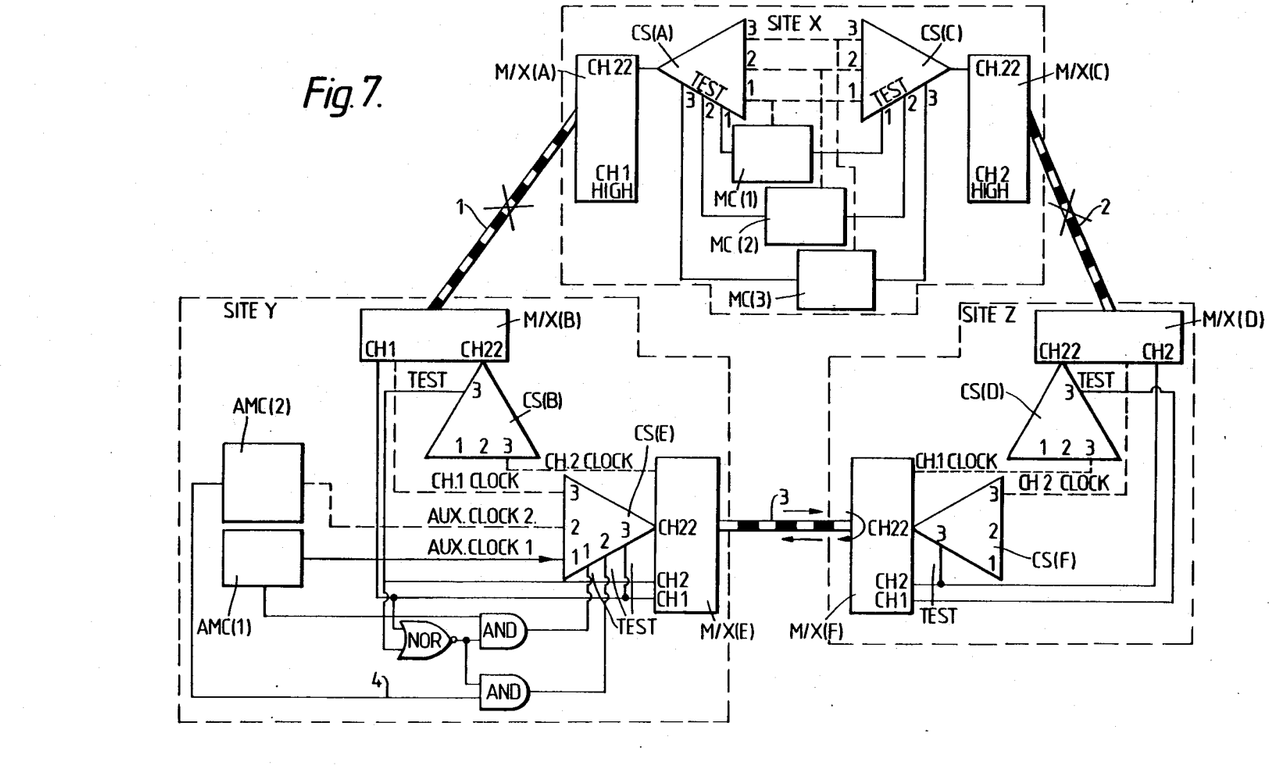

In the event of failure of any two of the three aggrgate data links, synchronised communications along the link which is still operative will continue. Should both links 1 and 2 fail, thereby isolating the master clocks at site X, then the auxiliary master clocks at site Y will be switched into service by the NOR/AND gate 4 as previously described. This situation is depicted in FIG. 7.

It can be seen that in the event of failure of synchronising clocks or of data links, those parts of the network which are still operative will still be synchronised one to another by means of the selective switching of the clock selector circuits.

Figure 8:
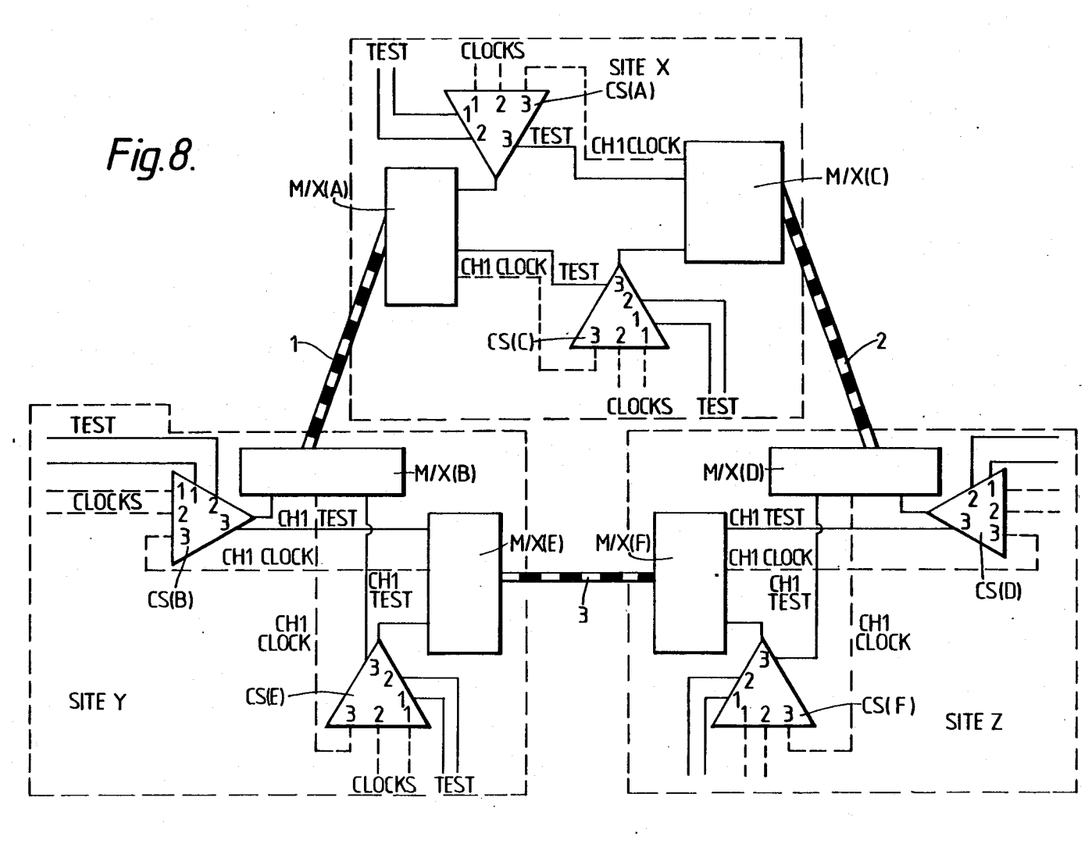
FIG. 8 is a schematic diagram of a data network according to the invention, the network including a plurality of synchronised clock sources.

Synchronising of the data network is somewhat simplified if clock sources are themselves synchronised sources such as those from British Telecom's digital data lines known as Kilostream. A data network incoporating Kilostream clock sources is shown in FIG. 8. Instead of the master clocks MC(1) etc and auxiliary clocks AMC(1) etc, Kilostream clocks are input to the clock sector circuits. As a back-up in the unlikely event of both Kilostream sources failing at one clock selector, the third input $I_3$ receives a clock input from an adjacent multiplexer.

Instead of all multiplexers being synchronised from one master clock, each site with Kilostream sources synchronises its multiplexers therefrom. Should one site not yet be supplied with Kilostream sources, as shown at site Z in FIG. 8, a synchronising clock source is accepted from another site as detailed previously with reference to FIGS. 3 to 7. In the event of failure of a data link or local Kilostream source, a clock selector circuit will select an alternative Kilostream source depending on the presence of a signal at its test inputs, or if no source is available, set its multiplexer to Slave to Receive, exactly as previously described.

Figure 9:
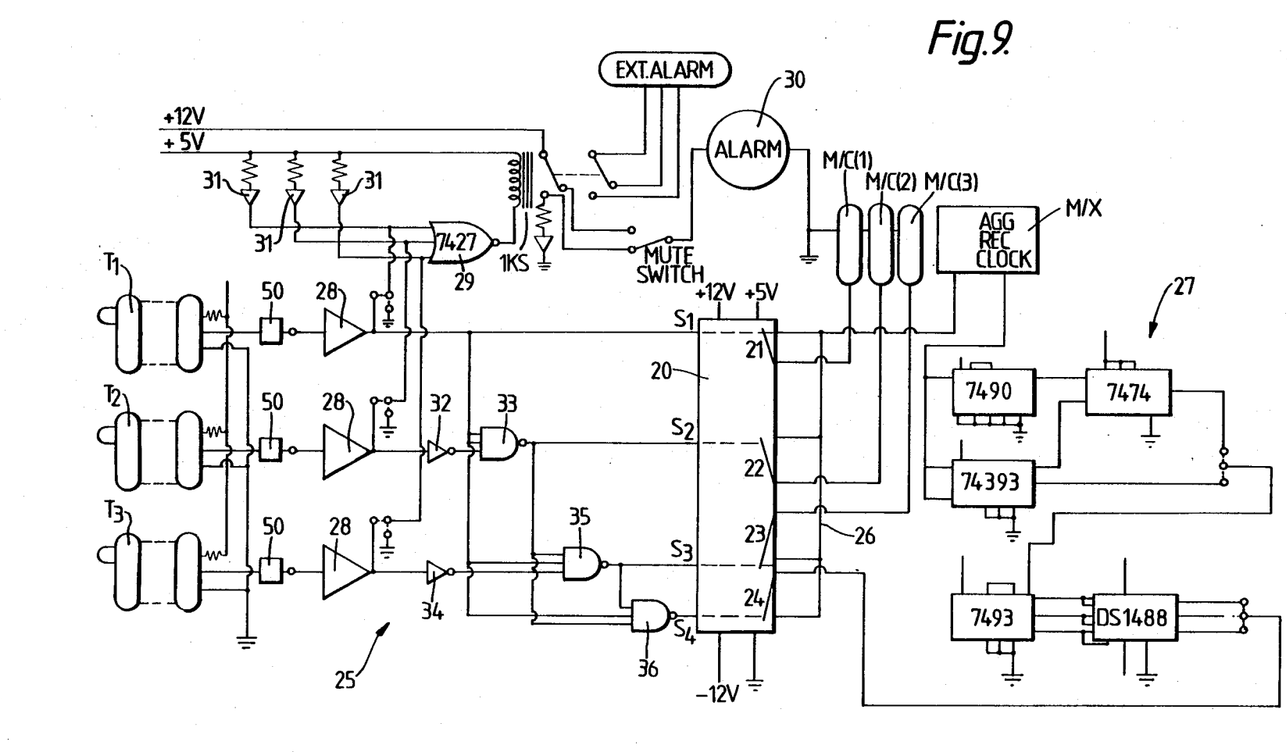
FIG. 9 is a circuit diagram of the clock selector of FIG. 2.

A typical clock selector circuit is shown in FIG. 9. Test inputs $T_1$, $T_2$ and $T_3$ are fed to a switching chip 20 via a logic circuit shown generally at 25. Depending on the signals received at inputs $S_1$, $S_2$, $S_3$ and $S_4$ the chip 20 operates any one of switches 21, 22, 23 or 24. Switches 21 to 23 connect clock sources MC(1), MC(2) and MC(3) respectively, to an output line 26 leading to a multiplexer M/X. Switch 24 connects to the output line 26 signals from the clock received at the multiplexer over the aggregate data link, suitably modified by a divider circuit shown generally at 27. This is the Slave to Receive option for the clock selector.

At the input to the logic circuit 25 are optional delay circutt 50 which only transfer changes in the test signals $T_1$, $T_2$, and $T_3$ if they subsist for longer than a predetermined time duration. This prevents undesired tripping of the clock selector by momentary loss of the test signals caused, not by failure of a clock signal, but by relatively harmless temporary effects such as bit corruption. The logic circuit comprises level converters 28 which also act as inverters, such that the absence of a signal at a particular test input prodcces a high at the output of its particular level converter 28 to trigger a NOR gate 29 to activate an alarm 30 and also to cancel the appropriate one of a series of display lamps 31.

From the level converter 28 test input $T_1$ is connected directly to $S_1$ of the chip 20, input $T_2$ being passed through a further inverter 32 and a NAND gate 33 before reaching input $S_2$. Similarly $T_3$ passes through inverter 34 and NAND gate 35 before reaching $S_3$, whilst input $S_4$ is connected to the output from a further NAND gate 36, the inputs thereto being the inputs to $S_1$, $S_2$ and $S_3$.

Chip 20 operates a switch on seeing a low signal at one of its inputs $S_1$ to $S_4$. Therefore, if test input $T_1$ is high, due to MC(1) being operational, the signal $S_1$ will be low due to the level converter 28 and switch 21 will supply MC(1) to the multillexer M/X. Simultaneously due to the presence of a low signal at $S_1$ the output of the NAND gates 33, 35 and 36 will be high, maintaining switches 22, 23 and 24 in an open position.

Should MC(1) fail then the output $T_1$ will be low, the input $S_1$ will be high and switch 21 will open. Provided $T_2$ is high then all inputs to the NAND gate 33 will be high, causing the output at $S_2$ to switch from high to low, opening switch 22 and connecting MC(2) to the output line 26. Similarly in the event of no signal at both $T_1$ and $T_2$, the switch 23 is closed to switch in MC(3).

A low signal at all test inputs $T_1$, $T_2$ and $T_3$ will cause all inputs to NAND gate 36 to be high, resulting in switch 24 closing and connecting the aggregate receive clock from multiplexer M/X to the output line 26, via dividing circuits 27. In this condition the multiplexer M/X is set to Slave to Receive.

The clock selector circuit of FIG. 9 is capable of switching between clock sources in less than 500 nanoseconds. Even though clock sources MC(1) to MC(3) may not be in synchronisation one with another, such rapid switching means that synchronisation of the data network is maintained with only a minimal disruption to data being transmitted.

Although the data networks described have been triangular networks, it will be apparent to those skilled in the art that the network can be extended by adding further triangular networks thereto. Similarly although clock selectors having three inputs have been described, it will readily be seen that selectors able to accommodate a larger number of inputs may easily be constructed.

We claim:

1. A data network comprising a plurality of multiplexers; at least one data link connecting the multiplexers one to another; a plurality of clock sources; means for generating at least one test signal; means for transmitting said at least one test signal from one multiplexer to another; and a plurality of clock selectors, each clock selector being associated with a respective one of the multiplexers, each clock selector having means for receiving at least one of the at least one test signal, means for determining the presence or absence of the at least one test signal to establish the status of one or more incoming clock signals, and means for selecting one of said incoming clock signals in predetermined hierarchical order in the presence of the at least one clock signal, and for supplying said selected clock signal to the respective multiplexer, and, in the absence of the at least one test signal, for setting the respective multiplexer to Slave to Receive mode in which the respective multiplexer takes incoming clock signals from one of the other multiplexers as its timing source.

2. A data network according to claim 1 wherein the means for selecting one of said incoming clock signals sets each respective multiplexer to Slave to receive mode if none of the at least one test signal received by the plurality of clock selectors is present.

3. A data network according to claim 1 wherein at least one clock selector is provided with one or more auxiliary clock sources, the at least one clock selector having means for supplying clock signals from one of the one or more auxiliary clock sources to its associated multiplexer in the absence of incoming clock signals from all of the other multiplexers.

4. A data network according to claim 1 wherein the clock sources are synchronised one to another.

5. A data network according to claim 1 wherein the means for generating one or more test signals comprises one or more of the multiplexers.

6. A data network comprising a plurality of multiplexers; at least one data link connecting the multiplexers one to another; a plurality of clock sources; means for generating at least one test signal; means for transmitting said at least one test signal from one multiplexer to another; and a plurality of clock selectors, each clock selector being associated with a respective one of the multiplexers, each clock selector comprising clock input means by which a plurality of clock signals are input to the clock selector, test input means by which at least one test signal is input to the clock selector, a test unit for determining the presence or absence of the at least one test signal, and switch means for selecting, in the presence of the at least one test signal, one clock signal in predetermined hierarchical order and for supplying said clock signal to the respective multiplexer, and in the absence of the at least one test signal, for setting the respective multiplexer to Slave to Receive mode in which the respective multiplexer takes incoming clock signals from one of the other multiplexers as its timing source, the switch means being actuated by signals from the test unit.

7. A clock selector adapted to be associated with a respective multiplexer, comprising clock input means by which a plurality of clock signals are input to the clock selector; test input means by which at least one test signal is input to the clock selector; a test unit for determining the presence or absence of the at least one test signal; and switch means for selecting one clock signal in predetermined hierarchical order and for supplying said clock signal to the respective multiplexer, or alternatively, in the absence of all of the at least one test signal, for setting the respective multiplexer to Slave to Receive mode, the switch means being actuated by signals from the test unit.

8. A data network including a clock selector according to claim 7.

9. A clock selector for association with a respective multiplexer, the clock selector comprising a plurality of clock input means by which synchronized clock signals are input to the clock selector; test input means by which at least one test signal is input to the clock selector, a test unit for determining the presence or absence of the at least one test signal, and switch means for selecting one clock signal in predetermined hierarchical order and supplying the clock signal to the respective multiplexer, the switch means being actuated by signals form the test unit, the predetermined hierarchical order for each clock selector being:
(i) a synchronized clock source input directly to the clock input means of that particular clock selector, or if none available;
(ii) a synchronized clock source output from another multiplexer at the same site, or if none available;
(iii) setting the respective multiplexer to Slave to Receive mode in which the respective multiplexer takes incoming clock signals form one of the other multiplexers as its timing source.

10. A method of selecting a clock source for a multiplexer in a data network comprising a plurality of multiplexers connected one to another by data links, the method including the steps of transmitting one or more test signals from one multiplexer to another; determining the presence or otherwise of the incoming test signals at a particular multiplexer; and, depending on the presence or otherwise of the one or more test signals, selecting one clock signal in predetermined hierarchical order and supplying it to said particular multiplexer or alternatively setting the particular multiplexer to Slave to Receive mode in which it takes incoming clock signals from one of the other multiplexers as its timing source.

11. A method according to claim 10 wherein the particular multiplexer is set to Slave to Receive mode in the absence of any of the one or more test signals thereat.

12. A data network comprising a plurality of multiplexers at a plurality of sites; at least one data link connecting the multiplexers one to another; a plurality of synchronized clock sources; means for generating at least one test signal; means for transmitting said at least one test signal from one multiplexer to another; and a plurality of clock selectors, each clock selector being associated with a respective one of the multiplexers, each clock selector comprising clock input means by which at least one clock signal is input to the clock selector, test input means by which at least one test signal is input to the clock selector, a test unit for determining the presence or absence of the at least one test signal, and switch means for selecting one clock signal in predetermined hierarchical order and for supplying the selected clock signal to the respective multiplexer, the switch means being actuated by signals from the test unit, the predetermined hierarchical order for each clock selector being:
(i) a synchronized clock source input directly to the clock input means of the particular clock selector, or if none avaiable;
(ii) a synchronized clock source output from another multiplexer at the same site, or if none available;
(iii) setting the respective multiplexer to Slave to Receive mode in which the respective multiplexer takes incoming clock signals from one of the other multiplexers as its timing source.

* * * * *